F. B. HOWELL.
DYNAMO ELECTRIC MACHINE.
APPLICATION FILED AUG. 30, 1907.
941,456.
Patented Nov. 30, 1909.
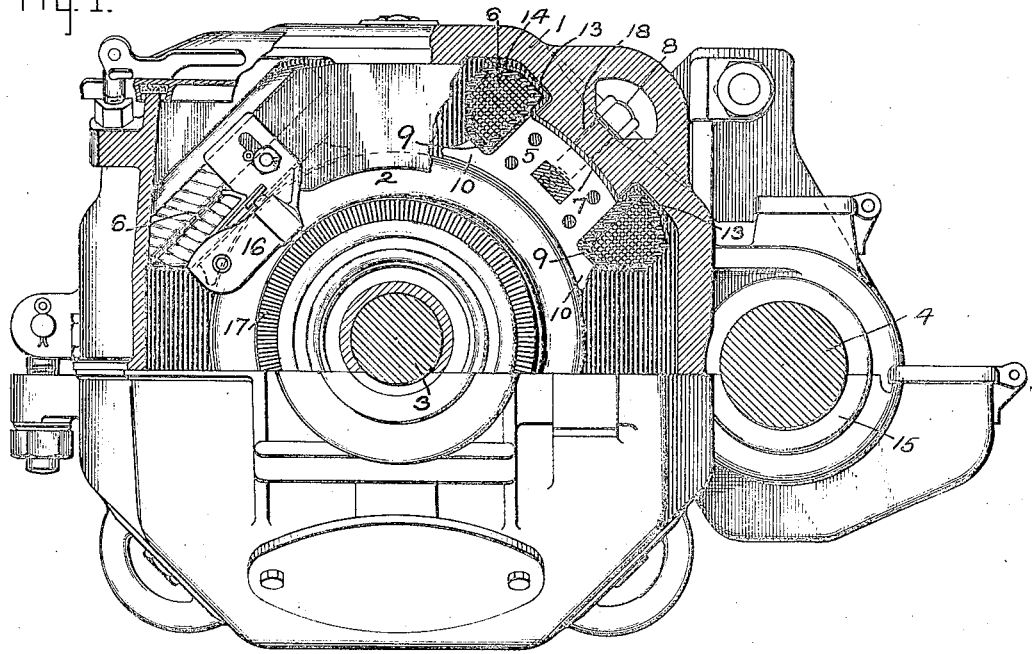
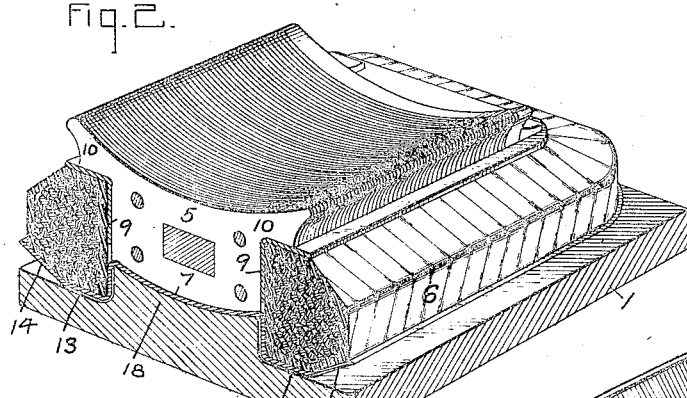
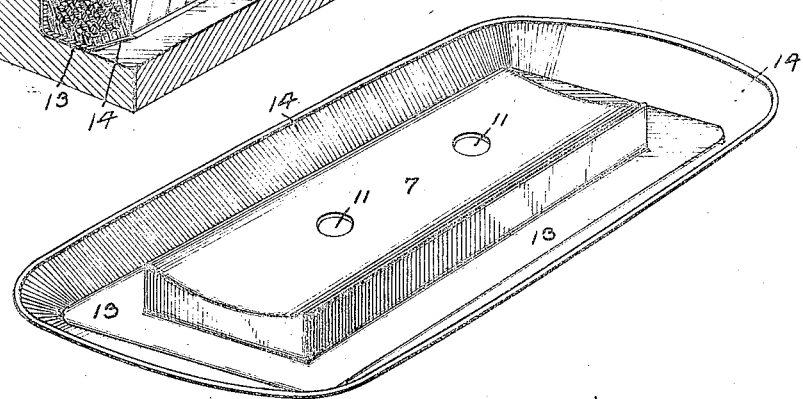
WITNESSES
W. Ray Taylor
Helen A. Ford
INVENTOR.
FRED B. HOWELL.
Albert J. Davis
by                    ATTY.

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

DYNAMO-ELECTRIC MACHINE.

941,456.　　　　Specification of Letters Patent.　　Patented Nov. 30, 1909.

Application filed August 30, 1907. Serial No. 390,754.

*To all whom it may concern:*

Be it known that I, FRED B. HOWELL, a citizen of the United States, residing at Schenectady, county of Schenectady, State of New York, have invented certain new and useful Improvements in Dynamo-Electric Machines, of which the following is a specification.

My invention relates to dynamo-electric machines, and more particularly to means for supporting the field coils thereof, and has for its object a construction which holds the field coils securely in place and is inexpensive.

Heretofore considerable difficulty has been experienced in railway motors, due to the loosening of the field coils. The coils have been held between the tips of the pole pieces and the portions of the frame adjacent the pole pieces. The loosening has been due to inaccuracies in the castings which prevent the obtaining of uniform pressure all around the coil. In order to overcome this defect, the parts of the frame adjacent the pole pieces were machined thus providing an accurate bearing surface, but this has been found to be an expensive process. By the use of my invention these objections are overcome.

For a full understanding of my invention, reference may be had to the following description taken in connection with the accompanying drawings, in which—

Figure 1 is a front view of a railway motor provided with field coil supports in accordance with my invention, with parts broken away and in section to show the interior construction; Fig. 2, is a perspective view of a field coil mounted on a pole piece and held in place by my support, parts being cut away, and Fig. 3 is a perspective view of my hat-shaped support.

The same reference numerals will be used throughout the specification and drawings to indicate like parts.

The motor frame 1 is suspended from the car axle 4, the axle turning in journals, one of which is shown at 15. The motor armature 2 is keyed to the shaft 3, power being transmitted from the shaft 3 to the axle 4 by means of gears, not shown. Brushes bear upon the commutator 17 and are supported in brush holders 16. Part 18 of the pole piece is preferably made integral with the frame of the motor. The other part 5 is made up of laminations which are riveted together, and this part of the pole piece has the integrally-formed tips 10.

The support is hat-shaped, as is seen in Fig. 3, and can be stamped out of sheet metal. The raised portion or crown-shaped part 7 fits over the part 18 of the pole piece. Holes 11 are provided to allow the bolts 8 to pass through the support. The coil 6 is then placed about the support and rests in the flanged portion. The laminated portion 5 of the pole piece is then put in place and by tightening the bolts 8, which hold this part of the pole piece, the coil is forced into the flanged portion of the support and held snugly. Preferably there is a flanged plate 9 placed between the pole tip 10 and the coil 6.

The flanged portions of the support may be bent upwardly at their outer edges 14. This is particularly advantageous when used on a coil which is at the bottom of a railway motor, for then the lower portion of the coil is inclosed in a water-tight receptacle, and water may, therefore, rise to a considerable level in the motor before it comes into contact with the coil.

I have illustrated my invention as particularly applicable to a railway motor, but it is evident to those skilled in the art that it might be used advantageously on any dynamo-electric machine, and that certain changes may be made therein, such as building the support of parts riveted together, without departing from the spirit thereof.

What I claim as new and desire to secure by Letters Patent of the United States, is:

1. In combination with the field pole of a dynamo electric machine provided with tips, of a field coil, and a field coil support comprising a raised portion and a flanged portion, said raised portion fitting over a portion of the field pole and said flanged portion holding said coil against said pole tips.

2. In combination with the field pole of a dynamo electric machine provided with tips, of a field coil, and a field coil support comprising a raised portion and a flanged portion extending around said raised portion, said raised portion fitting over a portion of the field pole and said flanged portion holding said coil against said pole tips.

3. As an article of manufacture, a field coil support having a crown-shaped portion 7 and a flanged portion 13, said flanged portion having upturned edges, substantially as described.

4. In a dynamo-electric machine, a field coil, a part of a pole provided with tips, a frame, a part of the pole integral with the frame, a field coil support comprising a raised portion fitting over said latter part of the pole and a flanged portion holding the coil against said pole tips.

5. In a dynamo-electric machine, a field coil, a part of a pole provided with tips, a frame, a part of the pole integral with the frame, a field coil support comprising a raised portion fitting over said latter part of the pole and a flanged portion holding the coil against said pole tips, said flanged portion having upturned edges, substantially as described.

6. In a dynamo-electric machine, a field coil, a portion of a pole provided with tips, another portion of the pole, a field coil support comprising a raised portion fitting over said latter portion of the pole and a flanged portion, said flanged portion holding the coil against the pole tips.

7. In a dynamo-electric machine, a field coil, a part of a pole provided with tips, a flanged plate fitting under said tips and over said coil, another part of the pole, a field coil support comprising a raised portion fitting over said latter part of the pole and a flanged portion holding the coil against the flanged plate, substantially as described.

In witness whereof, I have hereunto set my hand this 28th day of August, 1907.

FRED B. HOWELL.

Witnesses:
BENJAMIN B. HULL,
C. CHRISTENSEN, Jr.